(No Model.)
W. D. PARKER.
MACHINE FOR WELDING AND TAPERING THE SHANKS OF EYEBOLTS.
No. 318,788. Patented May 26, 1885.
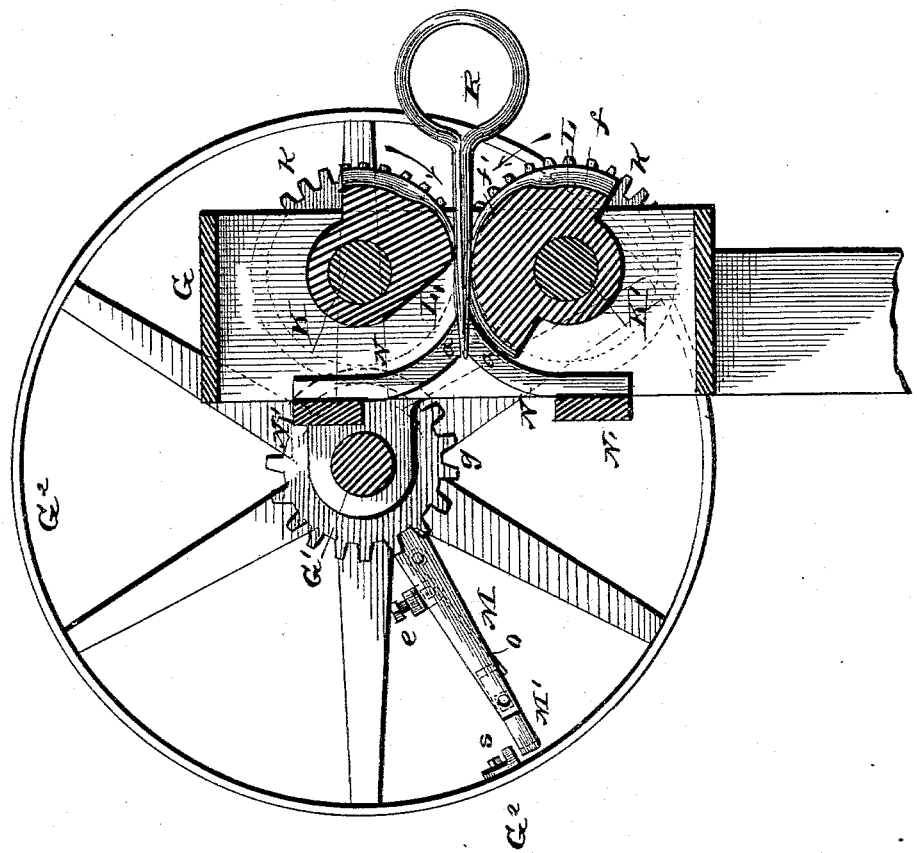
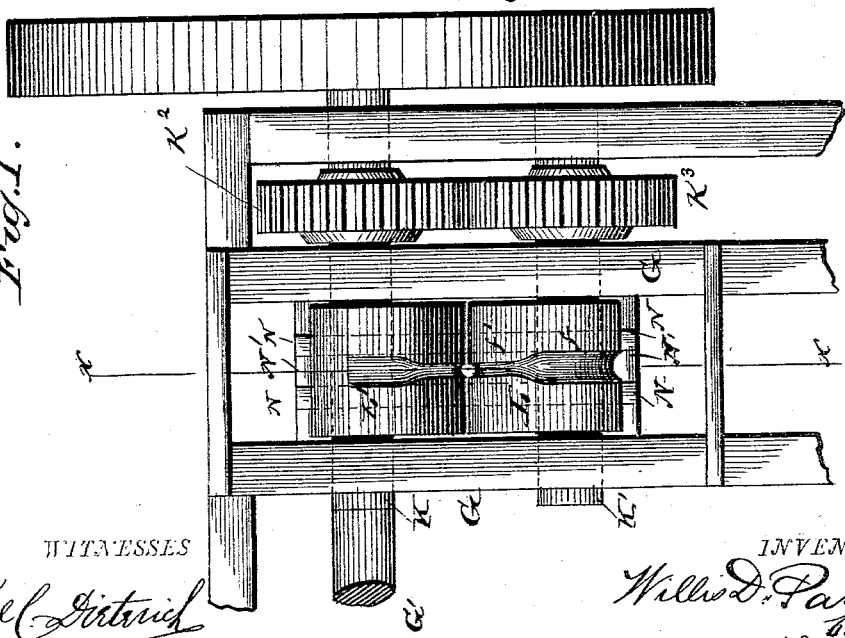
WITNESSES
INVENTOR

United States Patent Office.

WILLIS D. PARKER, OF DELPHI, INDIANA.

MACHINE FOR WELDING AND TAPERING THE SHANKS OF EYEBOLTS.

SPECIFICATION forming part of Letters Patent No. 318,788, dated May 26, 1885.

Application filed March 17, 1884. (No model.)

*To all whom it may concern:*

Be it known that I, WILLIS D. PARKER, of Delphi, in the county of Carroll and State of Indiana, have invented certain new and useful Improvements in Machines for Welding and Tapering the Shanks of Eyebolts; and I do hereby declare that the following is a full, clear, and exact description thereof, reference being had to the accompanying drawings, and to the letters of reference marked thereon, which form part of this specification.

This invention relates to machines which are designed for welding and tapering the shanks of eyebolts; and it consists in certain novel devices for readily effecting the above object and preventing breakage in the event of undue strain, as will be hereinafter explained.

In the annexed drawings, Figure 1 is a front elevation of my improved machine. Fig. 2 is a vertical section through Fig. 1, taken in the plane indicated by dotted line $x$ $x$ thereon, showing a blank in process of being welded and tapered.

The letter G designates a suitable frame, which affords bearings for the two horizontal shafts K K', having keyed on their ends spur-wheels $K^2$ $K^3$ of equal diameter.

On the shafts K K' are the tapering and swaging rolls L L'. The lower roll, L, is about half of a cylinder, and in its periphery is formed the lower half-groove, $f$, tapered, as shown, and terminating in a narrow groove, $f'$. The upper roll, L', is about one-quarter of a circle or cylinder, and it is made so for the purpose of affording time to run the shanks of the bolts back between the rolls before swaging and drawing take place. The upper roll, L', is grooved like the bottom roll, and the grooves in both rolls are arranged so as to match when the rolls come together in their revolution, which is in the direction indicated by the arrows on Fig. 2.

Directly in rear of the rolls, and rigidly secured to horizontal bars N' N', fixed to the frame G, are two guide-bars, N N, which are in parallel vertical planes arranged to leave a suitable space between them for the passage of the shank of an eyebolt. These guide-bars N N are curved, as shown in Fig. 2, so that they conform to the cylindricity of the rolls and receive between them the end of the shank of a bolt during the process of welding and tapering it close to the bite of said rolls. The bars N N are beveled on their inner edges at $a$ $a$, as shown in Fig. 5 of the drawings, for the purpose of centrally guiding the bolt-shank and preventing lateral displacement thereof during the operation.

It is obvious that the rolls may be made of any desired length, and that any desired number of shaping-grooves may be made in their faces alongside of each other.

G' is a shaft bearing a belt-wheel, $G^2$, and a pinion spur-wheel, $g$, for driving the rolls L L'. The belt-wheel $G^2$ is not keyed on its shaft G', but is secured to it by a safety catching device, which is of great importance in the machine, for the purpose of preventing the breaking or derangement of the parts should the shank of the eyebolt-blank be misadjusted between the segmental surfaces of the rolls L L' outside of the grooves therein. This safety-catch consists of an arm, M, which is keyed on shaft G', to which arm is pivoted a tripping-lever, M', one end of which bears against a spring, O, fastened to the arm M, and is provided with a tension screw-stop, $e$. On the inner side of the rim of the belt-wheel is fixed a stop, $s$, against which the outer end of the tripping-lever bears when the machine is running without undue strain. Should the shank of a blank be misplaced between the drawing-rolls, the strain will be so great that the spring O will yield and allow the lever M' to become released from the stop $s$, thus allowing the belt-wheel to turn freely on its shaft and the rolls will cease to rotate.

Having described my invention, I claim—

1. In a machine for welding and tapering eyebolts, the combination of segmental welding and drawing rolls with curved and beveled guide-bars adapted to operate substantially in the manner and for the purposes specified.

2. The combination, with the grooved rolls, the guide-bars and driving-gearing, of the safety-catch for loosening the driving-pulley on its shaft to prevent injury by undue strain, substantially as described.

In testimony that I claim the foregoing as my own I affix my signature in presence of two witnesses.

WILLIS D. PARKER.

Witnesses:
J. C. ODELL,
ELISHA ODELL.